US012689220B2

(12) United States Patent
Endo et al.

(10) Patent No.: US 12,689,220 B2
(45) Date of Patent: Jul. 21, 2026

(54) POWER SOURCE SYSTEM

(71) Applicant: TOYOTA JIDOSHA KABUSHIKI KAISHA, Toyota (JP)

(72) Inventors: Yasuhiro Endo, Toyota (JP); Junta Izumi, Nagoya (JP); Hironori Miki, Nagoya (JP); Kenji Kimura, Nagoya (JP); Takayuki Ban, Nishio (JP); Takuya Mizuno, Nagakute (JP); Shuji Tomura, Nagakute (JP); Naoki Yanagizawa, Nagakute (JP); Kazuo Ootsuka, Nagakute (JP); Hiroshi Tsukada, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 63 days.

(21) Appl. No.: 18/430,786

(22) Filed: Feb. 2, 2024

(65) Prior Publication Data

US 2024/0266839 A1      Aug. 8, 2024

(30) Foreign Application Priority Data

Feb. 8, 2023      (JP) .................................. 2023-017555

(51) Int. Cl.
     *H02J 3/46*          (2026.01)
(52) U.S. Cl.
     CPC ...................................... *H02J 3/46* (2013.01)

(58) Field of Classification Search
CPC ........ H02J 3/46; H02J 7/0063; H02J 7/00304; H02J 7/0031; H02J 7/00714
See application file for complete search history.

(56) References Cited

U.S. PATENT DOCUMENTS

| | | | | |
|---|---|---|---|---|
| 11,926,229 | B2 * | 3/2024 | Minamii ................. | H02J 7/345 |
| 2015/0175014 | A1 * | 6/2015 | Fetzer ....................... | H02J 7/14 |
| | | | | 318/139 |
| 2019/0031125 | A1 * | 1/2019 | Rozman .................. | B60L 53/20 |
| 2021/0311130 | A1 * | 10/2021 | Wallisch ................ | H02S 40/32 |
| 2021/0336549 | A1 | 10/2021 | Karakama et al. | |
| 2022/0255329 | A1 * | 8/2022 | Yanagizawa .......... | H02J 7/0025 |

FOREIGN PATENT DOCUMENTS

| | | |
|---|---|---|
| CN | 203611774 U | 5/2014 |
| JP | 2022-120255 A | 8/2022 |
| KR | 10-2007-0016413 A | 2/2007 |

* cited by examiner

*Primary Examiner* — Rexford N Barnie
*Assistant Examiner* — Thai H Tran
(74) *Attorney, Agent, or Firm* — Oliff PLC

(57) ABSTRACT

A power source system includes a first battery string, a second battery string, and a third battery string. Each of the battery strings includes a plurality of batteries capable of outputting direct-current power. The battery strings are Y-connected so as to output three-phase alternating-current power to three-phase output terminals (alternating-current output terminals) as well as connected to a neutral line. On the neutral line, a neutral line capacitor for blocking a direct current, a neutral line switch disposed in series to the neutral line capacitor, and an electric resistance element disposed in parallel to the neutral line switch are provided.

4 Claims, 6 Drawing Sheets

POWER SOURCE SYSTEM

CROSS-REFERENCE TO RELATED APPLICATION

This application claims priority to Japanese Patent Application No. 2023-017555 filed on Feb. 8, 2023, incorporated herein by reference in its entirety.

BACKGROUND

1. Technical Field

This disclosure relates to a power source system.

2. Description of Related Art

Japanese Unexamined Patent Application Publication No. 2022-120255 (JP 2022-120255 A) discloses a three-phase alternating-current power source that uses first to third battery strings.

SUMMARY

A three-phase alternating-current power source can be realized by Y-connecting first to third battery strings as described in JP 2022-120255 A. However, in a three-phase alternating-current power source having first to third battery strings in a three-phase three-wire circuit configuration, due to the restriction of the sum of the three phases being zero, the instantaneous current is determined haphazardly, which degrades the power factor (the phase difference between voltage and current). One conceivable solution is to connect the first to third battery strings to a neutral line so as to establish a three-phase four-wire circuit configuration. In a three-phase four-wire alternating-current power source, as a zero phase current can be passed (i.e., the sum of the three phases need not be zero), all the three phases can be placed under phase control to thereby mitigate degradation in power factor.

In a circuit configuration in which first to third battery strings are connected to a neutral line, a short-circuit current can occur. One conceivable measure to reduce the short-circuit current is to provide a capacitor (neutral line capacitor) for blocking a direct current on the neutral line. However, in a circuit configuration having a capacitor provided on a neutral line, an inrush current can occur. Specifically, starting power supply from the first to third battery strings to the three-phase output terminals in a state where the neutral line capacitor has not been charged causes an inrush current to flow to the neutral line capacitor.

This disclosure has been devised to solve the above-described problem, and an object thereof is to reduce the short-circuit current and the inrush current in a three-phase four-wire alternating-current power source using first to third battery strings.

In accordance with one form according to this disclosure, a power source system having the configuration shown below is provided. This power source system includes a first battery string, a second battery string, and a third battery string. Each of the first to third battery strings includes a plurality of batteries capable of outputting direct-current power. The first to third battery strings are Y-connected so as to output three-phase alternating-current power to three-phase output terminals as well as connected to a neutral line. On the neutral line, a neutral line capacitor for blocking a direct current, a neutral line switch disposed in series to the neutral line capacitor, and an electric resistance element disposed in parallel to the neutral line switch are provided.

According to this configuration, the neutral line switch is put in an interrupted state before actual power supply is started, which makes it possible to execute pre-charging of the neutral line capacitor while reducing the inrush current by the electric resistance element. The short-circuit current is reduced by the charged neutral line capacitor. Thus, the short-circuit current and the inrush current can be reduced in a three-phase four-wire alternating-current power source using first to third battery strings.

Each of the first to third battery strings may be a single series battery string (a battery assembly in which a plurality of batteries capable of separately switching between application and non-application of a voltage is connected in series). Or each of the first to third battery strings may be a battery module including a plurality of series battery strings that is connected in parallel.

According to this disclosure, it is possible to reduce the short-circuit current and the inrush current in a three-phase four-wire alternating-current power source using first to third battery strings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
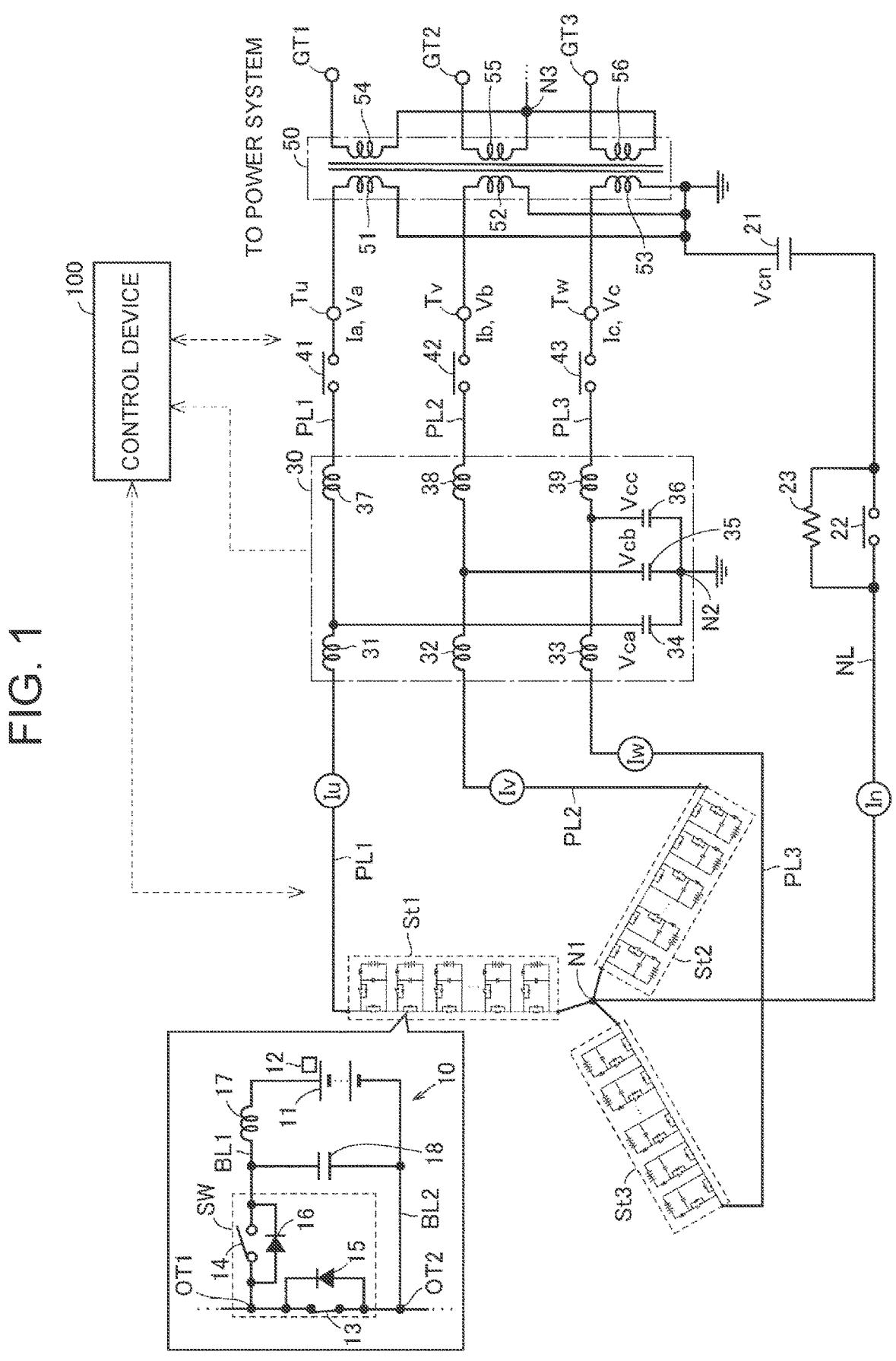
FIG. 1 is a diagram showing a schematic configuration of a power source system according to an embodiment of this disclosure.

An embodiment of this disclosure will be described in detail below with reference to the drawings. The same or corresponding parts in the drawings will be denoted by the same reference sign and description thereof will not be repeated.

FIG. 1 is a diagram showing a schematic configuration of a power source system according to this embodiment. Referring to FIG. 1, the power source system according to this embodiment includes a battery string St1 (first battery string), a battery string St2 (second battery string), a battery string St3 (third battery string), power lines PL1, PL2, PL3, a filter circuit 30, relays 41, 42, 43, a neutral line NL, alternating-current output terminals Tu, Tv, Tw, a transformer 50, system terminals GT1, GT2, GT3, and a control device 100. Hereinafter, the three relays 41, 42, 43 may be collectively referred to as "three-phase relays 41 to 43." The three alternating-current output terminals Tu, Tv, Tw may be collectively referred to as "three-phase output terminals Tuvw."

Each of the battery strings St1 to St3 is configured to be able to output direct-current power. The battery strings St1 to St3 are Y-connected so as to output three-phase alternating-current power to the three-phase output terminals Tuvw as well as connected to the neutral line NL. The battery strings St1, St2, St3 correspond to a U-phase battery string, a V-phase battery string, and a W-phase battery string, respectively. The alternating-current output terminals Tu, Tv, Tw are electrically connected to the system terminals GT1, GT2, GT3 through the transformer 50. The system terminals GT1, GT2, GT3 are electrically connected to a power system (commercial power source; not shown). The power system is an electric power grid that supplies electric power to each consumer who has made a contract with, for example, an electric power company.

The battery strings St1 to St3 are configured to exchange electric power with the power system. While this is not shown, the alternating-current output terminals Tu, Tv, Tw are respectively provided with current sensors that detect Ia, Ib, Ic that are currents flowing through these output terminals and voltage sensors that detect Va, Vb, Vc that are voltages applied to these output terminals. Detection results (Ia, Ib, Ic, Va, Vb, Vc) of these sensors are output to the control device 100.

A negative electrode terminal of each of the battery strings St1 to St3 is connected to a neutral point N1. The power lines PL1, PL2, PL3 connect positive electrode terminals of the battery strings St1, St2, St3, respectively, on one side and the alternating-current output terminals Tu, Tv, Tw, respectively, on the other side to each other. On the power lines PL1, PL2, PL3, the relays 41, 42, 43 that switch between conduction and interruption of the power lines PL1, PL2, PL3, respectively, are provided. Each of the relays 41, 42, 43 may be an electromagnetic mechanical relay. Each of the relays 41, 42, 43 is controlled by the control device 100. In this embodiment, each of the relays 41, 42, 43 is a normally-off relay. Therefore, each of the relays 41, 42, 43 is kept in an interrupted state (OFF state) when no instructions are being received from the control device 100. The relays 41, 42, 43 correspond to examples of "first phase relay," "second phase relay," and "third phase relay," respectively, according to this disclosure.

On the power lines PL1, PL2, PL3, the filter circuit 30 connected to a neutral point N2 is further provided. The filter circuit 30 includes a first LCL filter (first filter circuit) formed by a capacitor 34 and inductors 31, 37, a second LCL filter (second filter circuit) formed by a capacitor 35 and inductors 32, 38, and a third LCL filter (third filter circuit) formed by a capacitor 36 and inductors 33, 39. The first LCL filter, the second LCL filter, and the third LCL filter are disposed between the battery strings St1, St2, St3, respectively, on one side and the relays 41, 42, 43, respectively, on the other side. Current sensors that detect Iu, Iv, Iw that are currents flowing through the power lines PL1, PL2, PL3, respectively, are provided between the first LCL filter, the second LCL filter, and the third LCL filter on one side and the battery strings St1, St2, St3 on the other side. Detection results (Iu, Iv, Iw) of the current sensors are output to the control device 100. The filter circuit 30 reduces a cross-current when a plurality of Y-connection systems or other power sources is used in parallel, or attenuates a current ripple component in each of the power lines PL1, PL2, PL3.

The filter circuit 30 functions as one example of "detection circuit" according to this disclosure. That is, the filter circuit 30 is configured to separately detect string voltages respectively output from the battery strings St1 to St3. Specifically, Vca, Vcb, Vcc that are voltages between terminals of the capacitors 34, 35, 36 included in the first to third LCL filters respectively correspond to the string voltages of the battery strings St1, St2, St3. While this is not shown, voltage sensors that detect the voltages between the terminals are respectively provided in the capacitors 34, 35, 36, and detection results (Vca, Vcb, Vcc) of these voltage sensors are output to the control device 100. This configuration makes it possible to detect the string voltages using the filter circuit.

The transformer 50 is a Y-Y-connected three-phase transformer. The transformer 50 includes Y-connected battery string-side coils 51, 52, 53 and Y-connected power system-side coils 54, 55, 56. Positive electrode terminals of the coils 51, 52, 53 are connected to the alternating-current output terminals Tu, Tv, Tw, respectively, while negative electrode terminals of these coils are commonly connected to the neutral line NL (ground line). Positive electrode terminals of the coils 54, 55, 56 are connected to the system terminals GT1, GT2, GT3, respectively, while negative electrode terminals of these coils are commonly connected to a neutral point N3.

The neutral line NL connects the neutral point N1 and the negative electrode terminals of the transformer 50 to each other. On the neutral line NL, a capacitor 21 (neutral line capacitor) for blocking a direct current, a relay 22 (neutral line switch) disposed in series to the capacitor 21, and an electric resistance element 23 (limiting resistor) disposed in parallel to the relay 22 are provided. The relay 22 may be an electromagnetic mechanical relay. The relay 22 is controlled by the control device 100. In this embodiment, the relay 22 is a normally-off relay. Therefore, the relay 22 is kept in an interrupted state (OFF state) when no instructions are being received from the control device 100.

In this embodiment, the inductance of the inductors 31 to 33 (battery string-side filter coils) is higher than the inductance of the inductors 37 to 39 (three-phase output terminal-side filter coils). Setting the inductance of the inductors 31 to 33 high can restrict a change in current in the event of a sudden change in voltage, such as momentary power failure, making it easier to prevent shutdown of devices due to an overcurrent abnormality.

In this embodiment, the capacitance of each of the capacitors 34 to 36 is lower than the capacitance of the capacitor 21. Setting the capacitance of the capacitors 34 to 36 (filter capacitors) low can reduce the inrush current upon turning the three-phase relays 41 to 43 on (see S11 of FIG. 2 to be described later).

Each of the battery strings St1 to St3 includes a plurality of battery circuits 10. Each of the plurality of battery circuits 10 includes direct-current output terminals OT1, OT2, a battery 11 capable of outputting direct-current power, a battery management system (BMS) 12, a switch circuit SW, a choke coil 17, and a capacitor 18. The battery 11 is a secondary battery capable of charging and discharging. The battery 11 may be a single secondary battery, or may be a battery pack formed by a plurality of secondary batteries. The BMS 12 includes various sensors that detect states (e.g., voltage, current, and temperature) of the battery 11 and outputs detection results to the control device 100. The control device 100 can acquire states (e.g., temperature, current, voltage, and state-of-charge (SOC)) of the battery 11 based on output signals of the BMS 12 (BMS signals). The BMS 12 may be configured to separately detect the state of each secondary battery. The SOC indicates a remaining amount of stored electricity and is, for example, a ratio, expressed as 0 to 100%, of the current amount of stored electricity to the amount of stored electricity in a fully charged state.

The switch circuit SW is configured to switch between connection and disconnection between the battery 11 and the direct-current output terminals OT1, OT2. In particular, the switch circuit SW includes a first switch 13 (hereinafter written as "SW 13"), a second switch 14 (hereinafter written as "SW 14"), a parallel diode 15 of the SW 13, and a parallel diode 16 of the SW 14. The SW 13 is located between the direct-current output terminals OT1, OT2 and switches between conduction and interruption of an electric path that directly connects the direct-current output terminal OT1 and the direct-current output terminal OT2 to each other. The SW 14 and the choke coil 17 are located on an electric line BL1 that connects the direct-current output terminal OT1 and a positive electrode of the battery 11 to each other. The direct-current output terminal OT2 is electrically connected to a negative electrode of the battery 11 through an electric line BL2. The capacitor 18 is connected to each of the electric line BL1 and the electric line BL2. Each of the SW 13 and the SW 14 is, for example, a semiconductor switch such as a field-effect transistor (FET).

In each battery string, adjacent battery circuits 10 are connected to each other by an electric line (string line). As the direct-current output terminal OT2 of one battery circuit 10 is connected to the direct-current output terminal OT1 of another battery circuit 10 adjacent to that battery circuit 10, these battery circuits 10 are electrically connected to each other. The number of battery circuits 10 included in one battery string is arbitrary, and may be five to 50 or may be 100 or more. The number of battery circuits 10 included in each of the battery strings St1 to St3 may be the same or may be different. The configuration of the battery circuit 10 shown in FIG. 1 is merely one example and can be changed as appropriate. For example, the choke coil 17 may be removed from the circuit. A wiring inductance may be adjusted according to the circuit configuration.

During a period in which the battery 11 is connected to the direct-current output terminals OT1, OT2 (connection period), the voltage of the battery 11 is applied between the direct-current output terminals OT1, OT2. During the connection period, the SW 14 connected in series to the battery 11 is controlled to be in an ON state (conducting state), while the SW 13 connected in parallel to the battery 11 is controlled to be in an OFF state (interrupted state). During a period in which the battery 11 is disconnected from the direct-current output terminals OT1, OT2 (disconnection period), the voltage of the battery 11 is not output to between the direct-current output terminals OT1, OT2. During the disconnection period, the SW 14 is controlled to be in an OFF state (interrupted state). During the disconnection period, the SW 13 is controlled to be in an ON state (conducting state) except for a transition period.

The control device 100 may control the string voltage by controlling the switch circuit SW according to a duty ratio that indicates the ratio between the connection period and the disconnection period. The duty ratio can be represented as, for example, the ratio (connection duty) of the length of the connection period to the total length of the connection period and the disconnection period. As the connection duty becomes higher, the ratio of the connection period to the disconnection period becomes higher. The control device 100 is configured to output three-phase alternating-current power from the battery strings St1 to St3 to the three-phase output terminals Tuvw by controlling the switch circuit SW (particularly the SW 13 and the SW 14) included in each of the battery strings St1 to St3 based on the string voltages (Vca, Vcb, Vcc) of the respective battery strings St1 to St3 detected by the filter circuit 30 (detection circuit).

In each of the battery strings St1 to St3 having the above-described configuration, the plurality of batteries 11 included in one string is configured to be able to separately switch between application and non-application of a voltage. This configuration makes it easy to generate three-phase alternating-current power by the battery strings St1 to St3. In particular, three-phase alternating-current power can be generated by a line voltage (a difference in potential among strings).

The control device 100 is a computer including, for example, a processor, a random-access memory (RAM), and a storage device. As the processor executes programs stored in the storage device, various processes (e.g., the control shown in FIG. 2 to be described later) are executed. However, these various processes are not limited to being executed by software, and can also be executed by dedicated hardware (electronic circuit). The control device 100 may further include a field-programmable gate array (FPGA) equipped with a function for executing sweep control.

Figure 2:
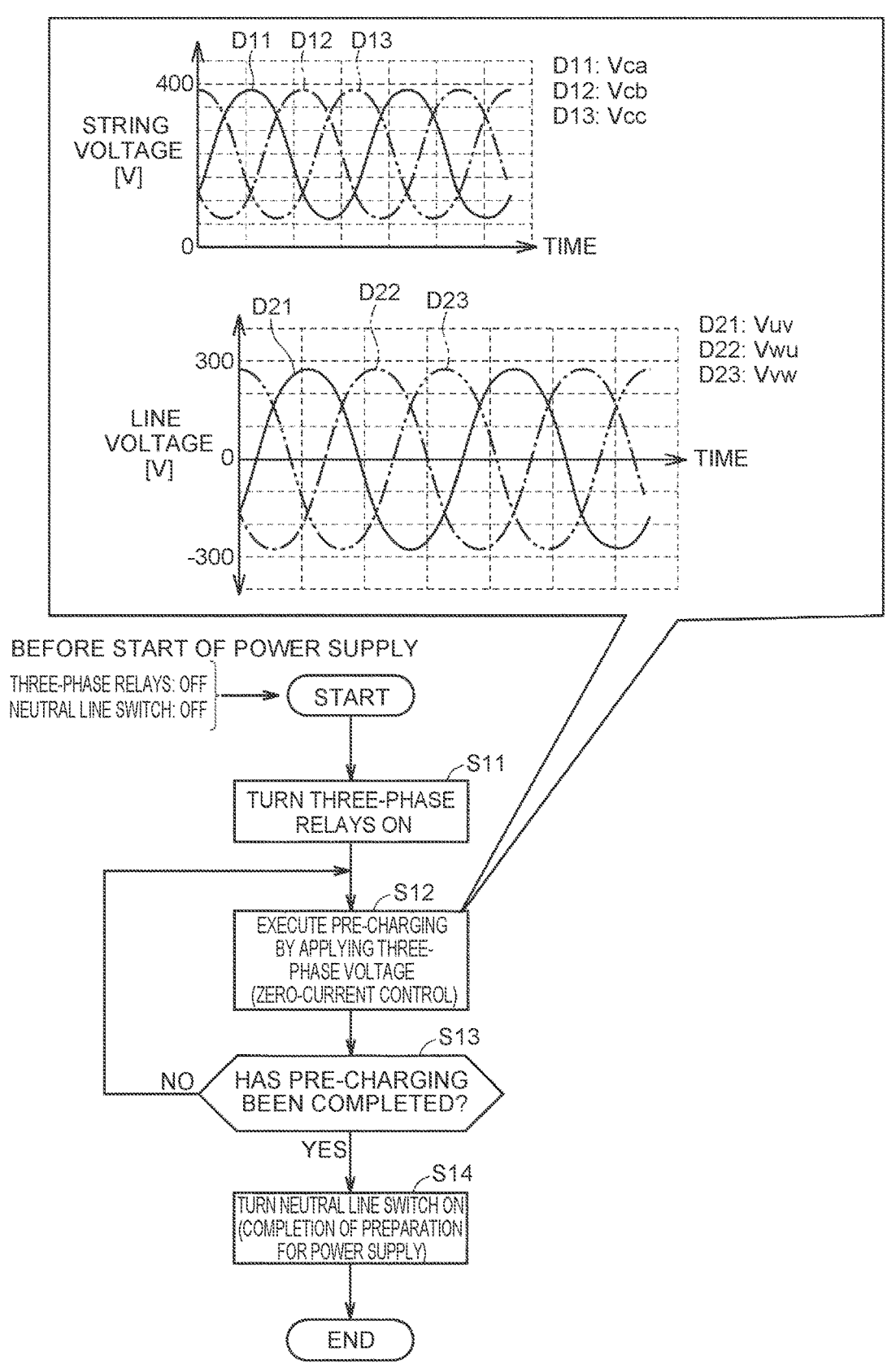
FIG. 2 is a flowchart showing processing relating to preparation for power supply by the power source system according to the embodiment of this disclosure.

FIG. 2 is a flowchart showing processing relating to preparation for power supply by the power source system (including the battery strings St1 to St3) according to this embodiment. Symbol "S" in the flowchart means a step. The processing shown in this flowchart is executed by the control device 100, for example, when the control device 100 starts up. When the control device 100 is in a shutdown state, each of the three-phase relays 41 to 43 and the relay 22 (neutral line switch) is in the OFF state (interrupted state). At the start of the processing (start), therefore, each of the three-phase relays 41 to 43 and the relay 22 is in the OFF state. The condition for starting the processing can be changed as appropriate. For example, the control device 100 may start the series of processes shown in FIG. 2 to execute power supply according to an energy management request relating to the power system upon receiving that request from a server that manages the power system.

Referring to FIG. 2 along with FIG. 1, in S11, the control device 100 puts the three-phase relays 41 to 43 in the ON state. Thus, each of the relays 41, 42, 43 assumes a conducting state and the filter capacitors (capacitors 34 to 36) are charged. Subsequently, in S12, the control device 100 controls the battery strings St1 to St3 (specifically, the SW 13 and the SW 14 in each switch circuit SW) such that the battery strings St1 to St3 output three-phase alternating-current power to the three-phase output terminals Tuvw. As a result of the process of S12, the battery strings St1 to St3 are enabled ("enable ON"), and switching operation is started in each battery string. As the three-phase alternating-current power is output to the three-phase output terminals Tuvw, pre-charging of the capacitor 21 (neutral line capacitor) is executed. Meanwhile, the control device 100 controls the battery strings St1 to St3 so as to bring the current values (Ia, Ib, Ic) of the respective alternating-current output terminals Tu, Tv Tw close to 0 (zero) A (zero-current control). When Ia, Ib, Ic become zero, the current is no longer exchanged between the battery strings St1 to St3 and the power system.

Waveforms D11, D12, D13 in FIG. 2 represent examples of the voltages of the battery strings St1, St2, St3, respectively. As these waveforms represent, the voltages of the respective battery strings St1 to St3 have voltage waveforms of 0 V or higher (waveforms with the same direction of the voltage) with an offset. These string voltages are output to the three-phase output terminals Tuvw via the filter circuit 30. Thus, a line voltage Vuv is applied between the alternating-current output terminals Tu, Tv; a line voltage Vwu is applied between the alternating-current output terminals Tw, Tu; and a line voltage Vvw is applied between the alternating-current output terminals Tv, Tw. Each line voltage has an alternating-current voltage waveform of which the polarity (positive and negative) changes periodically (waveforms of which the direction of the voltage changes). Waveforms D21, D22, D23 in FIG. 2 represent examples of the line voltages Vuv, Vwu, Vvw, respectively.

In the subsequent S13, the control device 100 determines whether pre-charging of the capacitor 21 has been completed. The control device 100 may determine that the pre-charging has not been completed while a predetermined time has not elapsed since the start of the pre-charging, and may determine that the pre-charging has been completed when the predetermined time has elapsed since the start of the pre-charging. However, without being limited thereto, the method for determining whether the pre-charging has been completed is arbitrary. The control device 100 may determine that the pre-charging has not been completed while Vcn (the voltage between the terminals of the capacitor 21) is lower than a predetermined value, and may determine that the pre-charging has been completed when Vcn becomes equal to or higher than the predetermined value.

When it is determined that the pre-charging of the capacitor 21 has not been completed (NO in S13), the processing returns to S12. Then, the pre-charging of the capacitor 21 is executed by the process of S12. When the pre-charging of the capacitor 21 is completed by the process of S12 (YES in S13), the processing moves to S14. In S14, the control device 100 puts the relay 22 in the ON state (conducting state). Thus, preparation for executing power supply from the power source system (including the battery strings St1 to St3) to the power system (system start-up) has been completed, and the series of processes shown in FIG. 2 ends. In the state where the preparation for power supply has been completed, each of the three-phase relays 41 to 43 and the relay 22 is in the ON state. The control device 100 that has received a power supply demand from an external server (not shown) in such a state may control the battery strings St1 to St3 (specifically, the SW 13 and the SW 14 in each switch circuit SW) based on Vca, Vcb, and Vcc detected by the filter circuit 30 such that the demanded three-phase alternating-current power is output to the three-phase output terminals Tuvw. For example, when the power system falls into a power failure state, an emergency management system (EMS), on behalf of the power system, may request the control device 100 to supply power (e.g., supply power to electric power loads). In the case where no demand for power supply is made to the control device 100 after completion of the pre-charging of the capacitor 21, the control device 100 may control the battery strings St1 to St3 so as to bring the current values of the three-phase output terminals Tuvw close to zero also after the completion of the pre-charging (i.e., after the series of processes shown in FIG. 2 has ended). Such zero-current control may be continued while no demand for power supply is made to the control device 100.

Figure 3:
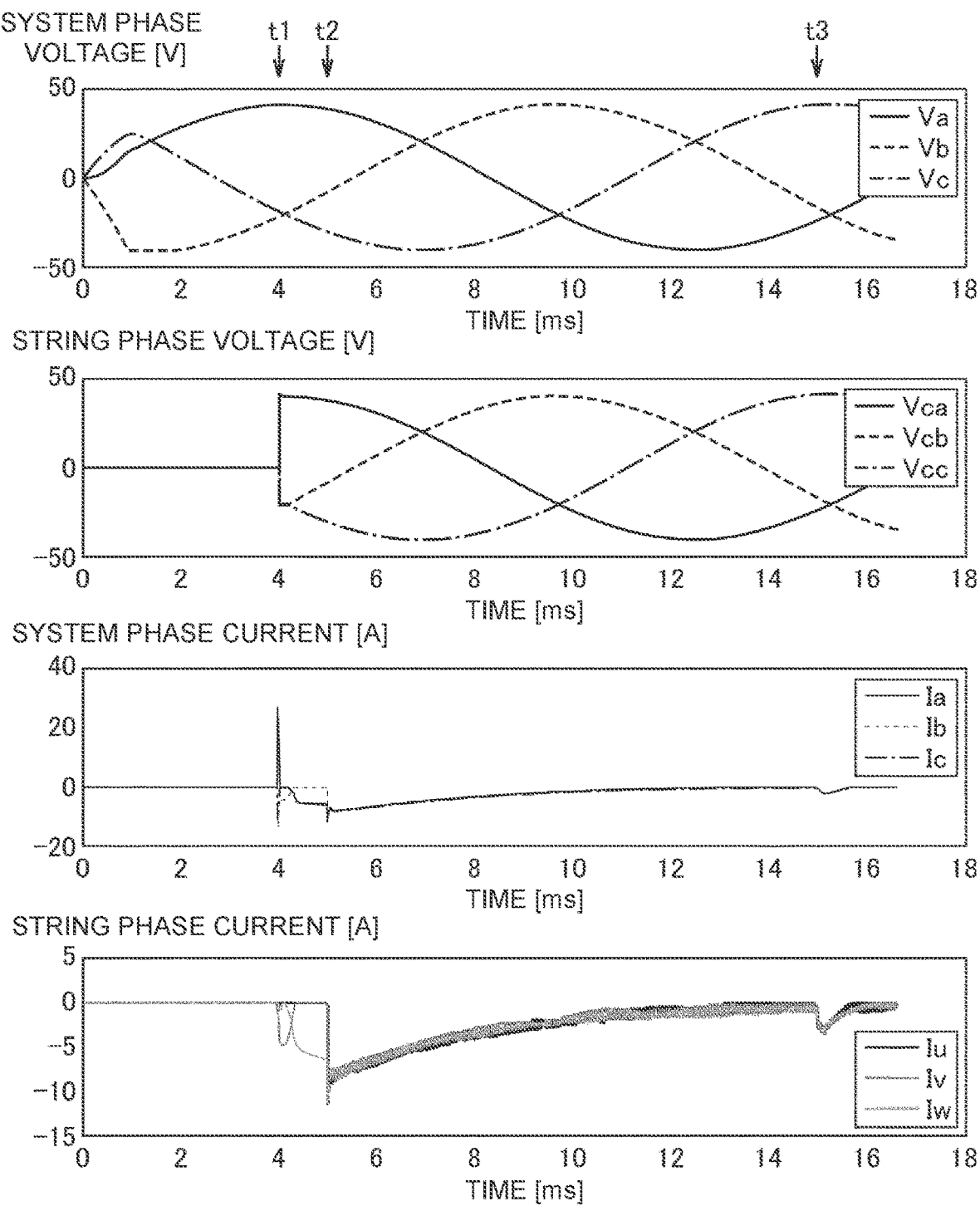
FIG. 3 is a time chart showing an example of operation waveforms in a first example in which the power source system according to the embodiment of this disclosure performs the preparation for power supply.

FIG. 3 is a time chart showing an example of waveforms of Va, Vb, Vc, Vca, Vcb, Vcc, Ia, Ib, Ic, Iu, Iv, Iw in a first operation example in which the power source system according to this embodiment performs the preparation for power supply (FIG. 2). Symbol "t" in the time chart means a timing. Each of Va, Vb, Vc (system phase voltages) and Vca, Vcb, Vcc (string phase voltages) shown in FIG. 3 is a voltage waveform of an alternating-current voltage of 50 V and a frequency of 60 Hz. Timings t1, t2, t3 correspond to the timings of "three-phase relays ON" (S11), "enable ON" (S12), and "neutral line switch ON" (S14).

Referring to FIG. 3, at t1, the battery strings St1 to St3 and the power system are electrically connected to each other, and the filter capacitors (capacitors 34 to 36) are charged. During the period from t2 to t3, as a result of the above-described zero-current control (S12 of FIG. 2), each of Ia, Ib, Ic (system phase currents) and Iu, Iv, Iw (string phase currents) approaches 0 A.

Figure 4:
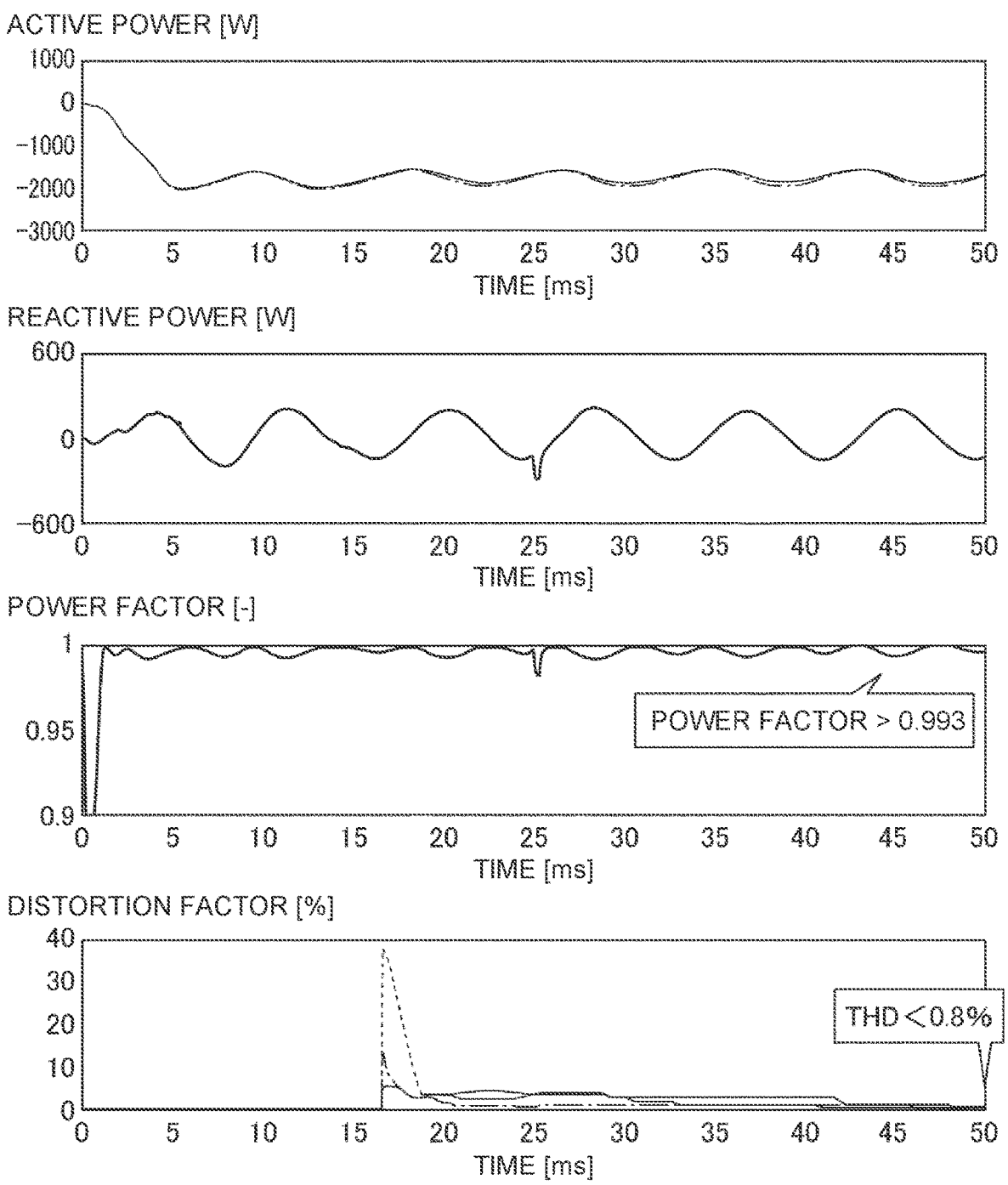
FIG. 4 is a time chart showing an example of operation waveforms of the three-phase four-wire alternating-current power source shown in FIG. 1.

FIG. 4 is a time chart showing an example of waveforms of active power, reactive power, a power factor, and a distortion factor when power supply was performed by the three-phase four-wire alternating-current power source shown in FIG. 1 under the conditions of an electric power command (load) of 1800 W, an alternating-current voltage of 200 V, and a frequency of 60 Hz. As shown in FIG. 4, pulsation of each of the active power and the reactive power is small, the power factor is close to one, and total harmonic distortion (THD) is smaller than 0.8%. Thus, the power source system according to this embodiment can achieve a high power factor.

Figure 5:
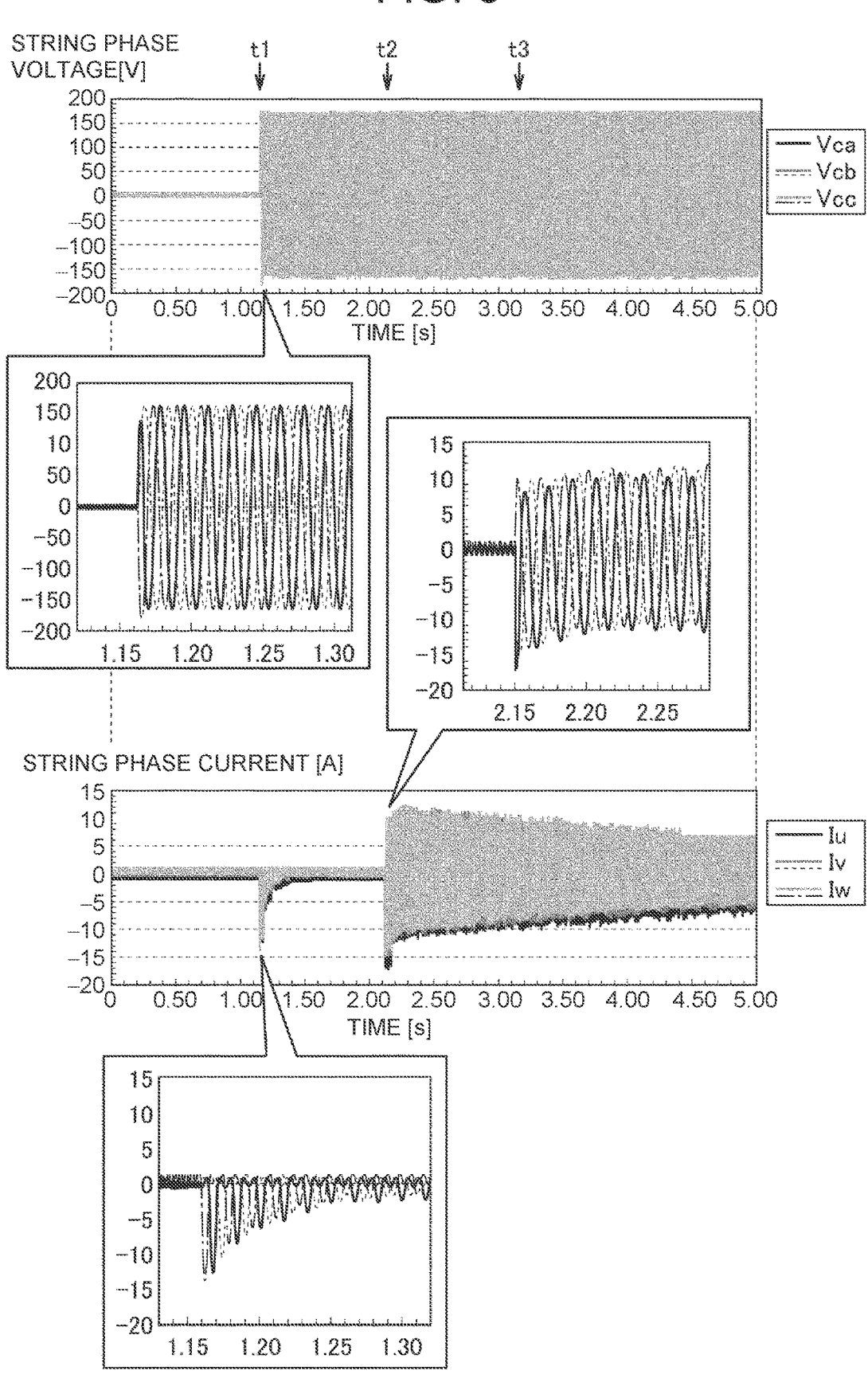
FIG. 5 is a time chart showing a first example of operation waveforms (Vca, Vcb, Vcc, Iu, Iv, Iw) in a second example in which the power source system according to the embodiment of this disclosure performs the preparation for power supply.
Figure 6:
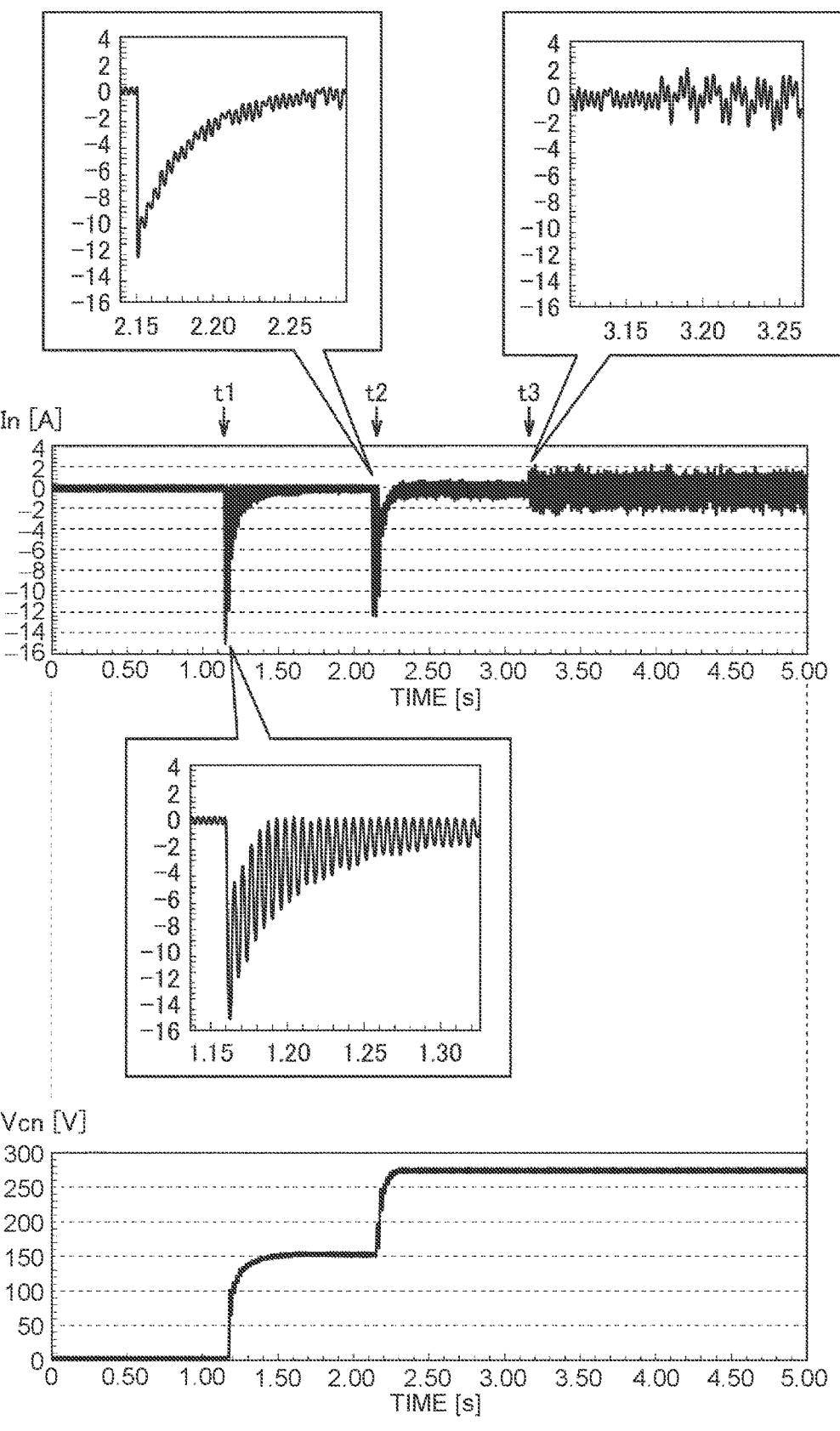
FIG. 6 is a time chart showing a second example of operation waveforms (Vcn, In) in a second example in which the power source system according to the embodiment of this disclosure performs the preparation for power supply.

FIG. 5 is a time chart showing an example of waveforms of Vca, Vcb, Vcc, Iu, Iv, Iw in a second operation example in which the power source system according to this embodiment performs the preparation for power supply (FIG. 2). FIG. 6 is a time chart showing an example of waveforms of Vcn and In in the second operation example in which the power source system according to this embodiment performs the preparation for power supply (FIG. 2). Vcn and In are respectively the voltage between the terminals of the capacitor 21 and the current flowing through the neutral line NL. These drawings show a result of conducting an experiment on a power source system having the configuration shown in FIG. 1. In each of the drawings, t1 (1.15 s), t2 (2.15 s), and t3 (3.17 s) correspond to the timings of "three-phase relays ON" (S11), "enable ON" (S12), and "neutral line switch ON" (S14), respectively.

In this example of implementation, a power system with a voltage (line voltage) of 200 V, a frequency of 60 Hz, and an output of 0 kW was connected to the system terminals GT1, GT2, GT3. The control device 100 performed the zero-current control by feedback control (more particularly, PI control).

Referring to FIG. 5 and FIG. 6, Iu, Iv, Iw did not converge to 0 A by t3 due to the influence of a control system (e.g., the control period is slow). However, as a result of the control device 100 continuing the zero-current control also after t3, a few seconds later, the current values (Iu, Iv, Iw) were corrected by an I-term (integral term) and settled to zero. At t1, the string phase current was about "−15 A." The inrush current in the neutral line NL was about "−16 A" as a peak value. During the pre-charging period (t2 to t3), the inrush current was reduced by the limiting resistor (electric resistance element 23). No inrush current was recognized at t3.

As has been described above, according to the power source system having the configuration shown in FIG. 1, the relay 22 is put in the interrupted state before actual power supply is started, which makes it possible to execute the pre-charging of the capacitor 21 while reducing the inrush current by the electric resistance element 23. The short-circuit current is reduced by the charged capacitor 21. Thus, the short-circuit current and the inrush current can be reduced in the three-phase four-wire alternating-current power source using the battery strings St1 to St3.

The control device 100 executes the processes shown in FIG. 2. The control device 100 executes the pre-charging of the capacitor 21 (neutral line capacitor) (S12) by outputting three-phase alternating-current power from the battery strings St1 to St3 (first to third battery strings) to the three-phase output terminals Tuvw when each of the relay 41 (first phase relay), the relay 42 (second phase relay), and the relay 43 (third phase relay) is in the conducting state and the relay 22 (neutral line switch) is in the interrupted state. After the pre-charging of the capacitor 21 is completed, the control device 100 puts the relay 22 in the conducting state (S14). This configuration makes it easy to appropriately perform the pre-charging of the capacitor 21. Moreover, during the execution of the pre-charging of the capacitor 21, the control device 100 controls the battery strings St1 to St3 so as to bring the current values of the three-phase output terminals Tuvw close to zero (S12). This configuration makes it easy to appropriately perform the preparation for power supply while reducing the inrush current during the execution of the pre-charging.

The embodiment disclosed this time should be construed as being in every respect illustrative and not restrictive. The scope of the present disclosure is indicated not by the description of the embodiment given above but by the claims, and is intended to include all changes within the meaning and the scope of equivalents of the claims.

What is claimed is:

1. A power source system comprising a first battery string, a second battery string, and a third battery string, wherein:

each of the first to third battery strings includes a plurality of batteries capable of outputting direct-current power;

the first to third battery strings are Y-connected so as to output three-phase alternating-current power to three-phase output terminals as well as connected to a neutral line;

on the neutral line, a neutral line capacitor for blocking a direct current, a neutral line switch disposed in series to the neutral line capacitor, and an electric resistance element disposed in parallel to the neutral line switch are provided;

a first phase relay, a second phase relay, and a third phase relay are provided bet twee the first battery string, the second battery string, and the third battery string, respectively, on one side and the three-phase output terminals on the other side;

the power source system further comprises a control device that controls the neutral line switch, the first phase relay, the second phase relay, and the third phase relay; and the control device is configured to execute the following:

executing pre-charging of the neutral line capacitor by outputting three-phase alternating-current power from the first to third battery strings to the three-phase output terminals when each of the first phase relay, the second phase relay, and the third phase relay is in a conducting state while the neutral line switch is in an interrupted state; and putting the neutral line switch in a conducting state after the pre-charging of the neutral line capacitor is completed.

2. The power source system according to claim 1, wherein the control device controls the first to third battery strings so as to bring current values of the three-phase output terminals close to zero during the execution of the pre-charging of the neutral line capacitor.

3. The power source system according to claim 1, wherein:

the power source system further comprises a detection circuit that separately detects string voltages respectively output from the first to third battery strings;

each of the first to third battery strings includes a plurality of battery circuits;

each of the plurality of battery circuits includes a battery, a direct-current output terminal, and a switch circuit that switches between connection and disconnection between the battery and the direct-current output terminal; and the control device is configured to output three-phase alternating-current power from the first to third battery strings to the three-phase output terminals by controlling the switch circuits respectively included in the first to third battery strings based on the string voltages of the respective first to third battery strings detected by the detection circuit.

4. The power source system according to claim 3, wherein:

the detection circuit includes a first filter circuit, a second filter circuit, and a third filter circuit;

each of the first filter circuit, the second filter circuit, and the third filter circuit includes a capacitor and an inductor; and the first filter circuit, the second filter circuit, and the third filter circuit are disposed between the first battery string, the second battery string, and the third battery string, respectively, on one side and the first phase relay, the second phase relay, and the third phase relay, respectively, on the other side.

* * * * *